United States Patent [19]

Hsia

[11] Patent Number: 5,260,239
[45] Date of Patent: Nov. 9, 1993

[54] EXTERNAL CATALYST REJUVENATION SYSTEM FOR THE HYDROCARBON SYNTHESIS PROCESS

[75] Inventor: Stephen J. Hsia, Baton Rouge, La.

[73] Assignee: Exxon Research & Engineering Company, Florham Park, N.J.

[21] Appl. No.: 992,981

[22] Filed: Dec. 18, 1992

[51] Int. Cl.⁵ .................. B01J 38/58; B01J 38/56; B01J 38/10; C07C 27/00
[52] U.S. Cl. ..................... 502/30; 422/140; 422/144; 422/145; 502/31; 502/33; 502/53; 518/700; 518/701; 518/709; 518/710
[58] Field of Search .......... 502/30, 31, 33, 53; 518/700, 701, 709, 710, 726

[56] References Cited

U.S. PATENT DOCUMENTS

| | | | |
|---|---|---|---|
| 2,567,932 | 9/1951 | Garbo et al. | 518/709 |
| 2,572,633 | 10/1951 | Lanning | 502/53 |
| 2,853,369 | 9/1958 | Kolbel et al. | 23/288 |
| 2,868,627 | 1/1959 | Kolbel et al. | 23/288 |
| 3,261,776 | 7/1966 | Baumann et al. | 208/113 |
| 3,629,143 | 12/1971 | Reveal | 502/31 |
| 3,661,799 | 5/1972 | Cartmell | 252/417 |
| 3,767,566 | 10/1973 | Cartmell | 208/120 |
| 4,751,057 | 6/1988 | Westerman | 422/197 |

FOREIGN PATENT DOCUMENTS

518524 11/1955 Canada .................. 518/709

OTHER PUBLICATIONS

"Petroleum Refining, Technology and Economics", Gary and Handwerk, Marcel Dekker, Inc., Publishers, 1975, Chapter 7, pp. 86–101.
"Effect of Fine Bubbles on Flow Properties in Bubble Column with Suspended Solid Particles", Morooka, et al., J. of Chem. Eng. of Japan, vol. 19, No. 6, 1986 pp. 507–512.
"Gas Holdup and Volumetric Liquid-Phase Mass Transfer Coefficient in Solid-Suspended Bubble Column with Draught Tube" Koide, et al. J. of Chem. Eng. of Japan, vol. 18, No. 3, 1985, pp. 248–254.
"Applications of Airlift Gas-Liquid-Solid Reactors in Biotechnology" Siegel and Robinson, Chem. Eng. Science vol. 47, No. 13/14 pp. 3215–3229, 1992.
"Sparged Loop Reactors" Joshi et al., The Canadian Journal of Chemical Eng. vol. 68, Oct. 1990, pp. 705–741.
"Reaction Technology in Bubble Columns", Deckwer, Fundamentals of Chemical Technology, Process Technology of the Chemical and Related Industries Otto Salle Verlag, publishers, 1985, chapter 1.
"Loop Reactors" Blenke, Adv. Biochem. Eng. vol. 13, 1979, pp. 121–214.
"The Catalytic Synthesis of Hydrocarbons from $H_2/CO$ Mixtures Over the Group VIII metals" Vannice, J of Catalysis 37, 449–461, 1975.
"Hydrocarbon Synthesis, Hydrogenation and Cyclization" Emmett, Catalysis vol. IV, Reinhold Publishing Corp. 1956, pp. 103–108.
"Titania Supported Metals as CO Hydrogenation Catalysts", Vannice, J of Catalysis, 74, 199–202 (1982).

*Primary Examiner*—Paul E. Konopka
*Attorney, Agent, or Firm*—Joseph J. Allocca

[57] ABSTRACT

Catalyst which has become deactivated during a hydrocarbon synthesis (HCS) process is reactivated - rejuvenated using an external reactivation - rejuvenation vessel resulting in a multiple HCS reaction - catalyst rejuvenation reactor vessel design. Flow of the catalyst is synthesis product slurry from the reactor vessel to the rejuvenation vessel and the flow of rejuvenated catalyst back to the reactor vessel are driven by gravity only.

3 Claims, 1 Drawing Sheet

EXTERNAL CATALYST REJUVENATION SYSTEM FOR THE HYDROCARBON SYNTHESIS PROCESS

FIELD OF THE INVENTION

This invention relates to a multi vessel arrangement for the practice of hydrocarbon synthesis process using catalysts which experience short term reversible deactivation during said process wherein the synthesis process is practiced in a first vessel means and the deactivated catalyst is reactivated - rejuvenated in a second vessel means and wherein the flow of a slurry of deactivated catalyst from the reactor vessel means to the reactivation vessel means and the flow of a slurry of reactivated catalyst from the reactivation vessel means to the reactor vessel through complimentary downcomer - conduit means in fluid communication between the respective vessel means is driven solely by gravity, no pumps or lift gases being employed. This arrangement allows for the continuous reactivation - rejuvenation of the catalyst.

BACKGROUND OF THE INVENTION

Fischer-Tropsch synthesis for the catalytic production of hydrocarbons from synthesis gas, i.e., carbon monoxide and hydrogen, is well known in the technical and patent literature. Similarly, the technology needed to convert natural gas or methane into synthesis gas is also well established. In like manner the conversion of methanol into high quality transportation fuels particularly middle distillate fractions, is also a well recognized technology.

The first commercial Fischer-Tropsch operation utilized a cobalt catalyst, though later iron catalysts were commercialized. The use of nickel-thoria on kieselguhr as a Fischer-Tropsch catalyst was an important advance in this field of catalysis. Additional developments led to more advanced cobalt catalysts comprising cobalt and thoria on kieselguhr, and cobalt-thoria - magnesia on kieselguhr.

In general the Group VIII non-noble metals, iron, cobalt and nickel have been widely used in Fischer-Tropsch reactions, these metals being promoted with various promoters and supported on a variety of supports.

Recently great strides have been made in catalysts for the conversion of synthesis gas, methanol and/or natural gas or methane into hydrocarbons suitable as transportation fuels or other high value products such as lubricants or specialty oils or waxes.

Examples of such advanced catalysts include particulate catalysts comprising cobalt or cobalt and thoria on titania or titania-containing supports, preferably a titania support having a rutile:anatase content of at least about 2:3, as determined in accordance with ASTM D 3720-78:Standard Test Method for Ratio of Anatase to Rutile in Titanium Dioxide Pigments By Use of X-Ray Diffraction. Additional examples of advanced cobalt catalyst include those comprising cobalt promoted with zirconium, hafnium, cerium or uranium and cobalt or cobalt and thoria promoted with rhenium deposited on inorganic oxides of Group III, IV, V, VI and VIII of the Periodic Table of Elements, preferably titania.

The mode of deactivation of such hydrocarbon synthesis catalysts is not too well understood, but is believed to be related, at least somewhat, to the mode in which the hydrocarbon synthesis is carried out; e.g., a different deactivation mode is likely present for catalyst in fixed bed operations than the deactivation mode for slurry phase operations. Thus, fixed bed processes are essentially plug flow operations involving reactant gradients as they progress through the catalyst bed whereas slurry phase operations involve sufficient backmixing tending towards a more uniform distribution of reactants and products throughout the slurry phase. For example, in a fixed bed water would not be present at the start of the reaction and would build up as the reaction progressed through the bed. However, in a slurry phase, e.g., in a slurry bubble column, because of backmixing effects, water will be present throughout the reaction slurry bed. Consequently, deactivation modes, dependent to any degree on the presence of water, will be different for fixed bed and slurry phase processes.

Reactivation - rejuvenation of such deactivated catalyst has been a pressing need in any consideration given to the commercialization of a hydrocarbon synthesis process.

Reactivation - regeneration involving air or oxygen burning of the catalyst to remove the deactivation moieties present on the catalyst followed by a hydrogen reactivation step has been a delicate process which is not always successful.

Similarly, hydrogen rejuvenation treatments have been employed with catalysts operated in fixed beds with, at best, limited and inconsistent recovery of hydrocarbon synthesis activity. In one case, steady state operation in the fixed bed had not been achieved, in other cases excessively high temperatures were employed, and still in other cases the hydrogen treatment was in the absence or substantial absence of hydrocarbon liquids. The development of a simple, reproducible reactivation - regeneration process and attendant hardware for treating deactivated hydrocarbon synthesis process catalyst would greatly contribute to the commercialization and success of hydrocarbon synthesis.

SUMMARY OF THE INVENTION

Catalytic hydrocarbon synthesis and reactivation - rejuvenation of deactivated hydrocarbon synthesis catalyst is practiced on a continuous basis employing an integrated apparatus comprising a hydrocarbon synthesis first vessel means containing synthesis gas introduction means at the bottom of said first vessel means and first catalyst downcomer - conduit means topped with gas disentrainment means, the top of said first catalyst downcomer - conduit mean being located just below the surface of a synthesis slurry comprising catalyst, synthesis gas and synthesis reactor product in the first vessel means, the first catalyst downcomer - conduit means being in fluid communication with a catalyst reactivator - rejuvenator second vessel means whereby the first catalyst downcomer - conduit means passes a slurry of spent catalyst in synthesis reactor product and/or added liquid hydrocarbon (as hereinafter defined) from the top of the first vessel means to the bottom of the second vessel means, said second vessel means containing rejuvenating gas introduction means at the bottom of said second vessel means whereby spent catalyst is reactivated - rejuvenated in said second vessel means in a rejuvenator slurry comprising catalyst, rejuvenating gas, and synthesis reactor product and/or added hydrocarbon liquid (as hereinafter defined), said second vessel means containing therein a second catalyst downcomer - conduit means topped with gas disentrainment means, the top of said second catalyst downcomer - conduit means being located just below the surface of the rejuvenation slurry in the second vessel means, the second catalyst downcomer - conduit means being in fluid communication with the hydrocarbon synthesis first vessel means whereby the second catalyst downcomer - conduit means passes a slurry of reactivated - rejuvenated catalyst in synthesis reactor product and/or added hydrocarbon liquid (as hereinafter defined) from the top of the second vessel means to the bottom of the first vessel means for reuse in the hydrocarbon synthesis process.

The reactivation - rejuvenation of reversibly deactivated (spent) hydrocarbon synthesis catalyst is effected on a continuous basis in the presence of synthesis product and/or added hydrocarbons using hydrogen or hydrogen containing gas using a multiple vessel apparatus system wherein spent catalyst in the presence of the synthesis product and/or added hydrocarbon but disentrained from synthesis gas or gaseous reactor products (first spent catalyst slurry) flows from one or more reaction vessel means (reaction unit) to one or more rejuvenation - reactivation vessel means (rejuvenation - reactivation unit) through first downcomer - conduit means topped with gas disentrainment means and wherein the regenerated - reactivated catalyst (reactivated catalyst slurry) disentrained from rejuvenation gas flows from the rejuvenation - reactivation unit back to the reactor unit via second downcomer - conduit means topped with gas disentrainment means, all flows being solely driven by gravity, no pumps or lift gases being employed, the hydrogen employed for the rejuvenation - reactivation being introduced into the rejuvenation - reactivation unit separately from the spent catalyst. Because of the gas disentrainment practiced at the top of each downcomer - conduit means, the density of the slurry in each said downcomer - conduit means is higher than the density of the slurry in the surrounding vessel, so the more dense slurry in the downcomer - conduit falls in said downcomer - conduit solely under the influence of gravity.

The rejuvenation of the spent catalyst in either the synthesis product and/or added liquid hydrocarbon, which is the subject matter of copending application U.S. Ser. No. 949,934 filed Sep. 24, 1992 and filed in the name of W. N. Mitchell, allows for the recovery of at least about 80+%, preferably at least 90+% of initial catalyst activity and is carried out at elevated temperatures and pressures and with sufficient liquid synthesis product and/or added liquid hydrocarbon for the full dispersion - immersion of the spent catalyst in the liquid. Generally, in those cases the rejuvenation is effected at hydrocarbon synthesis pressures, and at temperatures no lower than about 100° F. below reaction temperatures. Rejuvenating gas comprising hydrogen or a hydrogen rich gas which may contain inerts such as $CH_4$, light hydrocarbons etc. but which is substantially free of CO or other hydrocarbon synthesis process feed gases is injected into a slurry of hydrocarbons and catalyst, preferably with sufficient energy from the rejuvenating gas alone to suspend the catalyst particles in the liquid. By use of separate reaction units and rejuvenation - reactivation units it is not necessary that the reactivation - rejuvenation be conducted at the reaction conditions. Indeed, use of separate units permits performing the HCS reaction process and the catalyst reactivation - rejuvenation process on a continuous basis, with each process being performed under optimal, uninterrupted conditions.

Performing the spent catalyst reactivation - rejuvenation process in a dedicated unit is ideal because the reactivation - rejuvenation process is performed in the absence of synthesis gas or other hydrocarbon synthesis process feed. Use of a dedicated unit permits the reactivation - rejuvenation to be conducted in the absence of such synthesis gas or other process feed without the need of interrupting such process feed flow; it is the catalyst which is removed from the synthesis gas feed rather than the converse.

Because the present process results in the continuous reactivation of catalyst taken from the reactor in a dedicated rejuvenation - reactivation zone it is not necessary to monitor the reaction process to determine deactivation trends or overall levels of catalyst activity to warrant reactivation. Further, because portions of the catalyst are being continuously reactivated the overall activity of the catalyst charge is maintained at a high level and process efficiency is maximized.

The overall catalyst activity would be monitored solely to correct massive deactivation resulting from unexpected process upset in which case reactivation of the entire catalyst charge on a total charge basis would be in order.

PREFERRED EMBODIMENT

Figure 1:
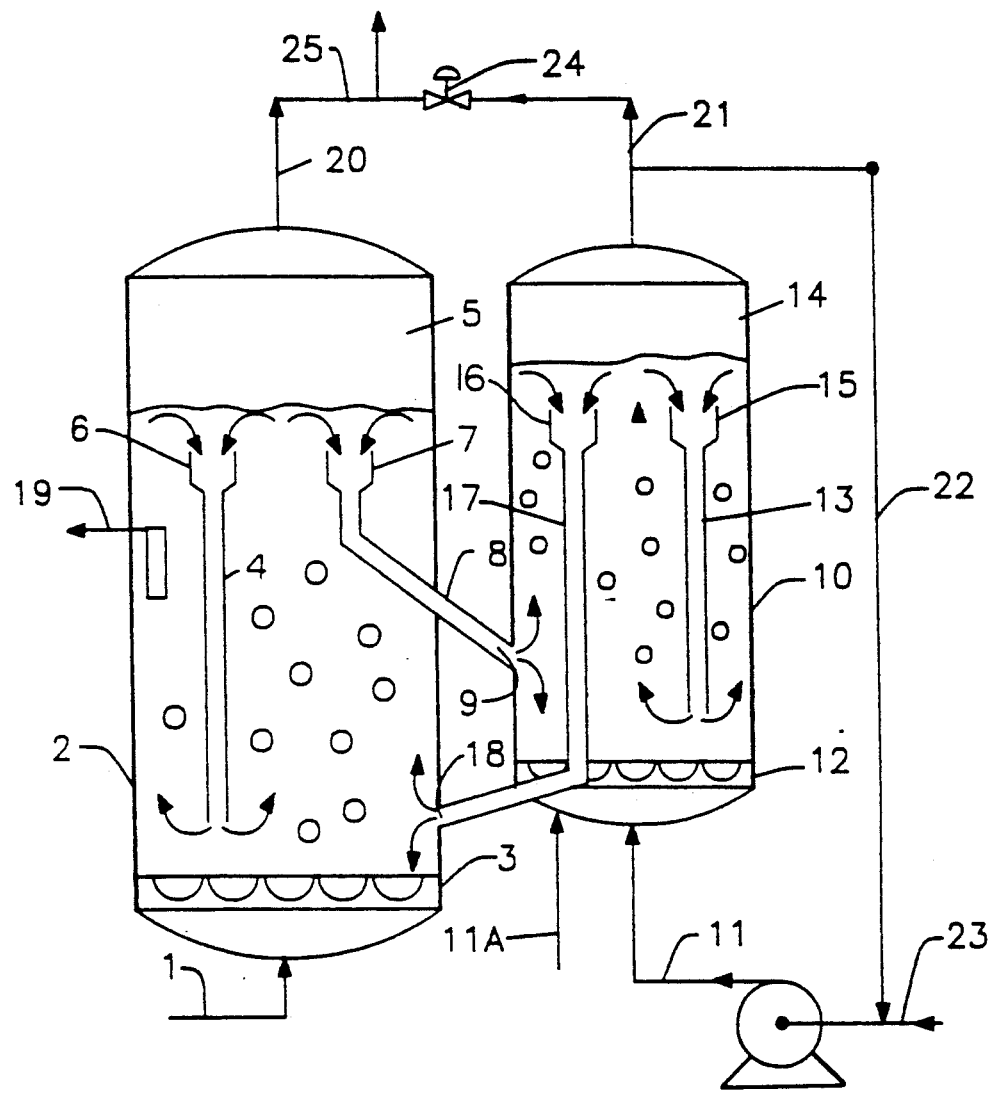
FIG. 1 is a schematic of one embodiment of a multiple vessel, continuous catalyst rejuvenation hydrocarbon synthesis process unit of the present invention.

Deactivated hydrocarbon synthesis catalyst, preferably cobalt containing hydrocarbon synthesis catalyst (spent catalyst) is reactivated - rejuvenated on a continuous basis by use of one or more dedicated reactivation - rejuvenation vessel means (reactivation unit) wherein the spent catalyst in synthesis product and/or added liquid hydrocarbon is passed from the hydrocarbon synthesis process reactor in the substantial absence of synthesis gas or process feed through a first downcomer - conduit means topped by gas disentrainment means into one or more rejuvenation - reactivation vessel means (reactivation unit) wherein the spent catalyst dispersed and immersed in liquid synthesis product and/or added liquid hydrocarbon is rejuvenated and the rejuvenated catalyst, still suspended in synthesis reactor product and/or added liquid hydrocarbon but disengaged from regenerating gas is passed from the reactivation unit through a second downcomer conduit means topped with gas disentrainment means back to the reactor unit, all catalyst flows being solely under the influence of gravity.

In the reaction vessel the spent catalyst downcomer - conduit means is positioned such that the top of the downcomer - conduit means is in the synthesis reaction slurry, preferably at or near but still below the the top surface of the synthesis slurry of catalyst and synthesis reaction product in the reaction vessel, the top of the downcomer - conduit means receiving and capturing spent catalyst and liquid synthesis product slurry disengaging the gas present in the slurry by means of the gas disentrainment means and passing said degassed slurry down the downcomer - conduit under the influence of gravity and through the downcomer conduit means combination to an exit orifice whereby the spent catalyst - hydrocarbon slurry is introduced into the reactivation unit at or near the bottom of said unit. The exit orifice is fitted with a baffle means which functions to prevent rejuvenation gas introduced into the bottom of the reactivation - rejuvenation unit from entering the bottom of the downcomer - conduit means and interfering with the downward flow of catalyst therein. Hydrogen is simultaneously introduced into the reactivation rejuvenation unit which is maintained at reactivation temperature and pressure. If liquid hydrocarbons are to be used either in addition to or in place of the liquid synthesis product as the liquid in which the catalyst is dispersed and immersed, said liquid hydrocarbon can be added into the bottom of the reactivation unit.

In the reactivation unit the spent catalyst in synthesis reaction product and/or liquid hydrocarbon slurry and hydrogen rise from the bottom to the top of the reactivation unit, the catalyst being reactivated in the course of the assent. To insure good dispersion and complete reactivation one or more recycle downcomer means can be employed in the reactivation unit whereby catalyst near the top of the reactivation unit is disengaged from the gas in the unit and is recycled back to the bottom of the reactivation unit. The recycle downcomer is a substantially vertical pipe, open at both ends topped by a gas disentrainment means as described hereinafter and guarded at its open bottom by a gas baffle or deflector to keep rejuvenation gas from entering the bottom of the recycle downcomer.

Reactivated catalyst near the top of the reactivation unit is disengaged from the reactivation hydrogen gas and any other light gaseous hydrocarbons and falls through the second downcomer conduit means for reintroduction through the exit orifice of said second conduit means into the bottom of the reaction unit for recycle to the HCS process. This exit orifice is likewise fitted with a baffle means to prevent synthesis gas from entering into the bottom of said downcomer - conduit means and interfering with the downward flow of catalyst therein. To insure optimal use of the catalyst in the reaction unit one or more recycle downcomer means are present in the reaction unit so that catalyst near the top of the reaction unit, when disengaged from any gaseous products or unreacted feed, is recycled through the downcomer to the bottom of the reaction vessel for circulation in the reaction zone. This recycle downcomer means is similarly a substantially vertical pipe, open at both ends, topped by a gas disentrainment means, as described hereinafter, and guarded at its open bottom by a gas baffle or deflector to prevent synthesis gas from entering the bottom of the recycle downcomer. This catalyst recycling downcomer is described and claimed in co-pending application, U.S. Ser. No. 994,218, Filed even date herewith in the names of Mauldin, Pedrick and Behrmann. To facilitate catalyst cycling in the various downcomers and downcomer - conduit means combinations, the tops of the downcomers of the different units are fitted with catalyst, directing means, such as trays, pans or funnels which direct the catalyst into the downcomer.

The catalyst slurries in either of the hydrocarbon synthesis reactor or reactivation - rejuvenation reactor once disengaged from the different gases in the different units by the gas disentrainment means at the top of the downcomer conduit will be of higher density than the catalyst slurries in the surrounding vessels. Gas will be disentrained from the respective slurries using the gas disentrainment means and because of the presence of the catalyst directing means, (e.g. trays or funnels) at the top of the downcomer the falling catalyst will fall onto the directing means and thereby be directed into the recycling downcomer means for efficient recycling to the bottom of the respective unit or passed through the downcomer conduit means to the bottom of the complimentary unit in the unit pair.

Hydrocarbon synthesis processes are carried out under slurry phase conditions, at elevated temperatures and pressures. Pressures typically range from 75–450 PSIA, more preferably 150–300 PSIA. Temperatures may range from about 175° C. to 450° C., preferably 175° C. to 420° C., more preferably 175° C. to 300° C. For Fischer-Tropsch processes hydrogen to carbon monoxide ratios in the feed gas may range from about 0.5 to 4.0, preferably about 0.7 to 2.5. In slurry phase operation, the slurry usually comprises about 10 wt % to 50 wt % catalyst solids, preferably 30 wt % to 40 wt % catalysts solids. The catalyst can be maintained in suspension in the slurry liquid by a combination of product recycle liquid, slurry recycle liquid, and injected synthesis gas feed. Preferably, essentially all of the energy required for maintaining the catalyst suspended in the slurry liquid is furnished by the synthesis gas feed.

For ease of operation the rejuvenation technique can be effected at hydrocarbon synthesis reaction conditions, whatever they may be but preferably temperatures and pressures optimized for catalyst reactivation regeneration may be used. Typically, the temperature may range to about 100° F. below synthesis conditions while pressures are maintained at synthesis conditions. Thus, regeneration rejuvenation is conducted at a temperature in the range 250°–500° F., preferably 360° to 440° F. while pressure ranges from 75 to 450 PSIA, preferably 150 to 300 PSIA.

Hydrogen treat rates during rejuvenation typically range from about 2–80 SCF/lb of catalyst, preferably about 5–20 SCF/lb of catalyst; or on another basis from about 0.5 to 20, preferably 1–5 SCF/lb catalyst - hydrocarbon mixture. Hydrogen partial pressure is in the range 15 to 300 PSIA, preferably 50 to 150 PSIA. The time for rejuvenation varies with hydrogen treat rates, temperatures, etc., but is usually accomplished in about 5 minutes to 10 hours, preferably about 20 minutes to 2 hours. Rejuvenation times in the present invention may be controlled to a degree by controlling the rate of flow between the unit so as to either lengthen or shorten the catalyst holdup - recycle time in the rejuvenation unit and the number of potential recycles the catalyst undergoes through the internal recycle downcomer in the rejuvenation unit.

Pure or plant hydrogen may be used. If plant hydrogen is used it must, of course, be free of known hydrogen synthesis catalyst poisons, as well as being substantially free of CO, the presence of which will interfere with the rejuvenation process.

While the mechanism for rejuvenation is uncertain, its occurrence is clearly demonstrable. However, those skilled in the art will not continue the rejuvenation procedure beyond the point of maximum activity recovery (a point easily determined with but a few experiments) because of the possibility that the liquid hydrocarbons in which the catalyst is slurred will undergo hydrogenolysis with attendant serious consequences for the catalyst. Perhaps, the reason that slurry phase hydrogen rejuvenation had not been attempted previously was the widespread belief that hydrogen treatment at elevated temperatures and pressures of hydrocarbon in the presence of a hydrogenation catalyst would lead to hydrogenolysis of the liquids.

The spent catalyst is dispersed and immersed in a hydrocarbon liquid during reactivation - rejuvenation. The liquid product of the hydrocarbon synthesis process is just such a hydrocarbon stream being liquid at reaction conditions, generally inert and a good solvent for the hydrogen rejuvenation gas. This liquid reaction product contain $C_5+$ hydrocarbons, usually $C_5$–$C_{100}$ hydrocarbons, plus small amounts of dissolved water and other synthesis gas products.

The hydrocarbon liquid used to disperse and immerse the spent catalyst during the reactivation - rejuvenation process can also comprise separately added high boiling paraffins containing small amounts of primary and secondary alcohols, acids, esters and mixtures thereof. The high boiling paraffins include $C_{10}$–$C_{100}$ linear or branched chain hydrocarbons. The liquid can contain oxygen atoms in the molecular structure but not sulfur, phosphorus, arsenic antimony or nitrogen atoms since these act as poisons in HCS processes. Examples of specific deliberately added slurry liquids materials are: dodecane, tetradecane, hexadecane, octadecane, hexatriacontane, tetracosane, octacosane, dotriacontane, tetracontane, tetratetracontane, and the like. The hydrocarbon liquid in which the spent catalyst is dispersed and immersed can also comprise a mixture of the hydrocarbon synthesis product hydrocarbons and deliberated added hydrocarbons or other organic species selected from the above recited list. Preferred slurry liquid materials are Fischer-Tropsch waxes and $C_{16}$–$C_{18}$ alkyl hydrocarbons.

The catalyst employed in the hydrocarbon synthesis process is any catalyst known to be active in Fischer-Tropsch synthesis. For example, Group VIII metals, whether supported or unsupported, are known Fischer-Tropsch catalysts. Of these, iron, cobalt and ruthenium are preferred, particularly iron and cobalt, most particularly cobalt.

A preferred catalyst is supported on an inorganic refractory oxide selected from Groups III, IV, V, VI, and VIII of the Periodic chart of the elements. Preferred supports include silica, alumina, silica-alumina, the Group IVB oxides, most preferably titania (primarily in the rutile form), and generally supports having a surface area of less than about 100 $m^2/gm$, preferably 70 $m^2/gm$ and less.

The catalytic metal is present in catalytically active amounts, usually about 100 wt %, (the higher concentrations being typical when iron based catalysts are employed), preferably 2–40 wt %, more preferably about 2–25 wt %. Promoters may be added to the catalyst and are well known in the Fischer-Tropsch catalyst art. Promoters can include ruthenium (when it is not the primary catalytic metal), rhenium, hafnium, cerium, and zirconium, and are usually present in amounts less than the primary catalytic metal (except for ruthenium which may be present in coequal amounts), but the promoter:metal ratio should be at least about 1:10. Preferred promoters are rhenium and hafnium. Useful catalysts are described in U.S. Pat. Nos. 4,568,663; 4,663,305; 4,542,122.

Catalyst particle size is important and particle sizes may range from that which is reasonably separable from the synthesis product to that which is reasonably able to be dispersed in a slurry phase. Particle sizes of 1–200 microns, preferably about 20 to 150 microns meet these requirements. Particles of this size which are easily separable from the synthesis product are those most advantageously benefitted by use of downcomers to provide improved dispersion. Particles of this size tend to be more influenced by gravity than are smaller particles which tend to stay in suspension and not settle out.

FIG. 1 presents one embodiment of the process of the present invention.

Hydrocarbon synthesis gas or reaction feed is introduced via line (1) into reaction vessel (2) maintained at reaction temperature and pressure. The hydrocarbon synthesis gas or other reaction feed is distributed in vessel (2) via distribution means (3) which insures even distribution of feed stream in the reaction vessel and contacting therein with the catalyst. The reaction proceeds as the reaction mixture proceeds up the vessel. To insure optimal use of the catalyst, downcomer means (4) is situated in the vessel (2). Catalyst disengages from the gaseous product and any unreacted gaseous feed component in gas disengaging zone (5) of vessel (2) and the catalyst fall under it's own weight onto catalyst directing means (6) of downcomer (4) and is recycled to the bottom of vessel (2). Similarly a portion of the catalyst in vessel (2) when disengaged from the gas falls into catalyst directing means (7) at the top of downcomer/conduit combination (8). The catalyst and liquid synthesis product in (8) is introduced by orifice (9) into the bottom of reactivation vessel (10). Hydrogen via line (11) is introduced into vessel (10) and distributed in said vessel by distribution means (12). Rejuvenation of the catalyst insured by means of downcomer (13) which cycles catalyst which is disengaged in gas disengaging zone (14) and falls into catalyst directing means (15) to the bottom of the reactivation vessel (10). A portion of the reactivated catalyst which has been disengaged from reactivation gas and any light gaseous hydrocarbons present therein in disengagement zone (14) falls under its own weight onto catalyst directing means (15) at the top of downcomer conduit combination (17) for passage through (17) and introduction via orifice (18) into the bottom of reactor vessel (2) for recycle to the reaction process. Hydrocarbon product is recovered via line (19) from reaction vessel (2) while synthesis gas and light hydrocarbons are recovered from vessel (2) via line (20). Hydrogen is recovered from vessel (10) via line (21) and recycled to vessel (10) via lines (22) and (11). Fresh hydrogen can be introduced into the reactivation vessel (10) via line (23). Pressure control system (24) on line (25) between vessels (10) and (2) insures zero $\Delta P$ between the tops of the two vessels and insures that catalyst flow between the two vessels proceeds smoothly.

If the reactivation is practiced in vessel (10) in the presence of added hydrocarbons or organics, such added hydrocarbon/organic can be introduced into vessel (12) via line (11) or separate line (11A).

What is claimed is:

1. A process for practicing catalytic hydrocarbon synthesis and reactivation rejuvenation of deactivated hydrocarbon synthesis catalyst on a continuous basis, said process comprising combining catalyst and synthesis feed and hydrocarbon liquid in a hydrocarbon synthesis first vessel means to produce a reactor slurry comprising catalyst, synthesis feed and synthesis product, collecting deactivated catalyst from the top of the reactor slurry by means of a first downcomer - conduit means the top of which is fitted with gas disentrainment means and which is located just below the top surface of the reactor slurry, passing the deactivated catalyst down this first downcomer - conduit means from the top of the first vessel means to the bottom of a reactivation - rejuvenation second vessel means, said second vessel means having rejuvenating gas introduction means located at its bottom, forming a reactivating slurry of catalyst in reaction product and rejuvenating gas, wherein the deactivated catalyst is reactivated - rejuvenated in said second vessel means, collecting reactivated - rejuvenated catalyst from the top of the reactivating slurry by means of a second downcomer - conduit means the top of which is fitted with gas disentrainment means and which is located just below the top surface of the reactivation slurry and passing the reactivated - rejuvenated catalyst down the second downcomer - conduit means from the top of the second vessel means to the bottom of the first vessel means, all catalyst downward flows on both the first and second downcomer means occurring solely under the influence of gravity.

2. The process of claim 1 wherein the first vessel means includes recycle downcomer means topped with gas disentrainment means for circulating catalyst within the hydrocarbon synthesis first vessel means.

3. The process of claim 2 wherein the second vessel means includes recycle downcomer means topped with gas disentrainment means for circulating catalyst within the reactivator - rejuvenator second vessel means.

* * * * *